(12) United States Patent
Noda

(10) Patent No.: US 11,063,284 B2
(45) Date of Patent: Jul. 13, 2021

(54) MEMBRANE ELECTRODE ASSEMBLY AND SOLID POLYMER FUEL CELL

(71) Applicant: 3M INNOVATIVE PROPERTIES COMPANY, St. Paul, MN (US)

(72) Inventor: Kazuki Noda, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 111 days.

(21) Appl. No.: 16/472,146

(22) PCT Filed: Dec. 19, 2017

(86) PCT No.: PCT/US2017/067235
§ 371 (c)(1),
(2) Date: Jun. 20, 2019

(87) PCT Pub. No.: WO2018/118875
PCT Pub. Date: Jun. 28, 2018

(65) Prior Publication Data
US 2020/0119380 A1 Apr. 16, 2020

(30) Foreign Application Priority Data
Dec. 20, 2016 (JP) .............................. JP2016-246631

(51) Int. Cl.
*H01M 8/10* (2016.01)
*H01M 8/1004* (2016.01)
*H01M 4/88* (2006.01)

(52) U.S. Cl.
CPC ......... *H01M 8/1004* (2013.01); *H01M 4/881* (2013.01); *H01M 4/8807* (2013.01)

(58) Field of Classification Search
CPC ... H01M 8/1004; H01M 4/8807; H01M 4/881
See application file for complete search history.

(56) References Cited

U.S. PATENT DOCUMENTS

| 4,539,256 A | 9/1985 | Shipman |
| 4,726,989 A | 2/1988 | Mrozinski |

(Continued)

FOREIGN PATENT DOCUMENTS

| EP | 2047553 | 4/2009 |
| JP | 2002260686 | 9/2002 |

(Continued)

OTHER PUBLICATIONS

Chow, "Fabrication of biologically based microstructure composites for vacuum field emission", Materials Science and Engineering, 1992, vol. A158, No. 1, pp. 1-6.

(Continued)

*Primary Examiner* — Jane J Rhee
(74) *Attorney, Agent, or Firm* — Lynn R. Hunsberger

(57) ABSTRACT

A membrane electrode assembly is provided that includes a nanostructured thin film catalyst as the anode electrode catalyst, the membrane electrode assembly having robustness to humidity variation. Additionally, a solid polymer fuel cell including this membrane electrode assembly is provided. A membrane electrode assembly of an embodiment of the present disclosure includes an electrolyte membrane; an anode electrode catalyst layer in contact with the electrolyte membrane; an anode gas diffusion layer; and a fluorinated polymer layer in contact with the anode electrode catalyst layer between the anode electrode catalyst layer and the anode gas diffusion layer. The anode electrode catalyst layer includes a plurality of nanostructure elements including acicular microstructured support whiskers supporting nanoscopic catalyst particles; and the fluorinated polymer layer includes one of fully-fluorinated or partially-fluorinated polymer particles that have been dispersed in a network form.

13 Claims, 3 Drawing Sheets

(56) References Cited

U.S. PATENT DOCUMENTS

| | | |
|---|---|---|
| 4,812,352 A | 3/1989 | Debe |
| 4,867,881 A | 9/1989 | Kinzer |
| 5,039,561 A | 8/1991 | Debe |
| 5,120,594 A | 6/1992 | Mrozinski |
| 5,260,360 A | 11/1993 | Mrozinski |
| 5,338,430 A | 8/1994 | Parsonage |
| 5,879,827 A | 3/1999 | Debe |
| 5,879,828 A | 3/1999 | Debe |
| 6,040,077 A | 3/2000 | Debe |
| 6,319,293 B1 | 11/2001 | Debe |
| 7,419,741 B2 | 9/2008 | Vernstrom |
| 2002/0004453 A1 | 1/2002 | Haugen |
| 2004/0131919 A1* | 7/2004 | Yasumoto ............ H01M 4/8828 429/490 |
| 2005/0142397 A1 | 6/2005 | Wakahoi |
| 2006/0093893 A1 | 5/2006 | Matsuo |
| 2010/0047668 A1 | 2/2010 | Steinbach |
| 2011/0151353 A1* | 6/2011 | Haug ................ H01M 4/8814 429/482 |
| 2014/0349215 A1* | 11/2014 | Debe ................ H01M 4/8657 429/524 |
| 2015/0024293 A1 | 1/2015 | Noda |
| 2016/0141696 A1* | 5/2016 | Tago ........................ C08F 8/44 429/408 |

FOREIGN PATENT DOCUMENTS

| | | |
|---|---|---|
| JP | 2003059498 | 2/2003 |
| JP | 2005-243295 A | 9/2005 |
| JP | 2008262741 | 10/2008 |
| JP | 2009-193777 A | 8/2009 |
| JP | 2012-501062 A | 1/2012 |
| JP | 2016-195105 A | 11/2016 |
| KR | 2005-0121911 | 12/2005 |
| WO | WO 2001-11704 | 2/2001 |

OTHER PUBLICATIONS

Kam, "Summary Abstract: Dramatic variation of the physical microstructure of a vapor deposited organic thin film", Journal of Vacuum Science & Technology A, Jul.-Aug. 1987, vol. 5, No. 4, pp. 1914-1916.

Morrison & Boyd, Organic Chemistry, 1002-1026, (1974).

International Search Report for PCT International Application No. PCT/US2017/067235, dated Mar. 13, 2018, 5 pages.

* cited by examiner

MEMBRANE ELECTRODE ASSEMBLY AND SOLID POLYMER FUEL CELL

CROSS REFERENCE TO RELATED APPLICATIONS

This application is a national stage filing under 35 U.S.C. 371 of PCT/US2017/067235 filed Dec. 19, 2017, which claims the benefit of JP Application No 2016-246631, filed Dec. 20, 2016, the disclosure of which is incorporated by reference in its/their entirety herein.

TECHNICAL FIELD

The present disclosure relates to a membrane electrode assembly and a solid polymer fuel cell.

BACKGROUND

In solid polymer fuel cells provided with a membrane electrode assembly (MEA) obtained by integrating an anode electrode, a polymer electrolyte membrane (PEM), and a cathode electrode, water is produced during operation of the fuel cell due to the electrochemical reaction of a fuel gas such as hydrogen gas with an oxidant gas such as air. If an excessive amount of the produced water accumulates as liquid water within the electrodes of the membrane electrode assembly, what is known as "flooding" will occur. That is, the supply of the fuel gas or the oxidant gas to the catalysts included in the anode electrode or the cathode electrode will be inhibited by the liquid water. As such, there is a need to easily drain water from the electrodes of a membrane-electrode assembly.

SUMMARY OF INVENTION

In one aspect, the present disclosure describes a method for manufacturing a membrane electrode assembly for a solid polymer fuel cell, the solid polymer fuel cell including an anode, a cathode, and a polymer electrolyte membrane formed from a catalyst and an ion-exchange membrane and disposed between the anode and the cathode; wherein the anode and/or the cathode is formed from a gas diffusion electrode including a gas diffusion layer substrate and a catalyst layer containing a catalyst and an ion-exchanging resin. The manufacturing method includes a catalyst layer forming step in which the catalyst layer is formed on at least a first surface of the ion-exchanging membrane; a water-repellent carbon layer forming step in which a water-repellent carbon layer is formed on the catalyst layer using a liquid obtained by dispersing a carbon black in a solvent-soluble fluorine-containing polymer solution substantially free of ion-exchange groups; and a gas diffusion layer substrate disposing step in which the gas diffusion layer substrate is disposed adjacent to the water-repellent carbon layer.

In another aspect, the present disclosure describes a fuel cell including a solid polymer electrolyte membrane and a fuel electrode and an air electrode arranged so as to sandwich the electrolyte membrane; wherein the air electrode includes a reaction layer and a gas dispersion layer from the electrolyte membrane side; in the fuel cell provided with a produced water adjusting layer that includes a water-repellent material on a surface of the reaction layer side of the gas diffusion layer, an intermediate layer is provided between the produced water adjusting layer and the reaction layer; the intermediate layer includes a water-repellent material and a hydrophilic material; and a concentration gradient is provided in the water-repellent material so that the concentration of the water-repellent material gradually decreases from the produced water adjusting layer toward the reaction layer.

Nanostructured thin film (NSTF) catalysts used in the electrode catalyst layers of membrane electrode assemblies include a plurality of nanostructured elements including acicular microstructured support whiskers that support nanoscopic catalyst particles. These nanoscopic catalyst particles have nanostructures that are constituted from a layer formed by coating the acicular microstructured support whiskers with platinum. These nanoscopic catalyst particles may also have nanostructures that are constituted from multiple layers formed by alternately coating the acicular microstructured support whiskers with platinum and another metal such as nickel, cobalt, manganese, or iron In NSTF catalysts, continuous thin films including platinum serves multiple important roles as electrodes of the fuel cell. Examples of these roles include dissociative adsorption at the anode electrode, proton transport, and electron transport.

Due to the fact that NSTF catalysts have a continuous thin film structure, surface area per unit mass of platinum is less than that of a general platinum-carbon catalyst obtained by dispersing nanoparticles of platinum on the surface of carbon black particles. NSTF catalysts have higher specific activity than general platinum-carbon catalysts, but that high specific activity may be offset by this undesirable feature. As such, in NSTF catalysts, it is desirable to maintain a state where liquid water does not cover the surface of the platinum so that fuel gas and oxidant gas can reach the catalysts. In other words, performance degradation due to flooding in NSTF catalysts is a problem that requires particular attention. The occurrence of flooding and the design of the flow field separator are closely related. Generally, flooding is prone to occur in flow channels that have short lengths and large cross-sectional areas because the flow rate of the fuel gas and/or the oxidant gas flowing therein is low.

When a NSTF catalyst is used as the anode electrode, excellent effects are displayed. Specifically, deterioration of the cathode electrode catalyst resulting from startup/shutdown (SU/SD) cycles is reduced. However, as described above, membrane electrode assemblies that include a NSTF catalyst as the anode electrode catalyst are significantly affected by flooding and, consequently, the operating humidity ranges thereof vary depending on the type of separator that is used.

The present disclosure provides a membrane electrode assembly including a NSTF catalyst as the anode electrode catalyst, the membrane electrode assembly having robustness to humidity variation; and a solid polymer fuel cell including this membrane electrode assembly.

According to one exemplary embodiment of the present disclosure, a membrane electrode assembly is provided that includes an electrolyte membrane; an anode electrode catalyst layer in contact with the electrolyte membrane; an anode gas diffusion layer; and a fluorinated polymer layer in contact with the anode electrode catalyst layer between the anode electrode catalyst layer and the anode gas diffusion layer. In such a membrane electrode assembly, the anode electrode catalyst layer includes a plurality of nanostructure elements including acicular microstructured support whiskers supporting nanoscopic catalyst particles; and the fluorinated polymer layer includes one of fully-fluorinated or partially-fluorinated polymer particles that have been dispersed in a network form.

According to another exemplary embodiment of the present disclosure, a solid polymer fuel cell is provided that includes the membrane electrode assembly described above; and an anode separator including at least one of parallel flow channels or opposing comb-shaped flow channels.

According to the present disclosure, a membrane electrode assembly including a NSTF catalyst as the anode electrode catalyst, the membrane electrode assembly having robustness to humidity variation; and a solid polymer fuel cell including this membrane electrode assembly can be obtained.

Specifically, in some embodiments of membrane electrode assemblies described herein, the fluorinated polymer layer includes one of fully-fluorinated or partially-fluorinated polymer particles that have been dispersed in a network-form. As such, blocking or closing of the flow channels, whereby the fuel gas such as hydrogen gas reaches the catalyst surface of the anode electrode catalyst layer, by liquid water can be prevented. With the solid polymer fuel cell that includes the membrane electrode assembly described above, output performance (e.g., cell voltage) of the fuel cell can be improved in cases where the fuel cell is used in over-humidification conditions, for example, in conditions where condensation easily occurs due to the fuel cell being at a low temperature when starting up, or in cases where the design of the separator flow field is disadvantageous with regards to the discharging of liquid water.

The membrane electrode assembly and the solid polymer fuel cell of the present disclosure can be advantageously used in automobile applications where the fuel cell is repeatedly started up and shut down and the fuel cell is sometimes placed in low-temperature conditions or fixed applications in cold climates.

The above descriptions should not be construed to be a disclosure of all of the embodiments and benefits of the present disclosure.

DESCRIPTION OF EMBODIMENT

Figure 1:
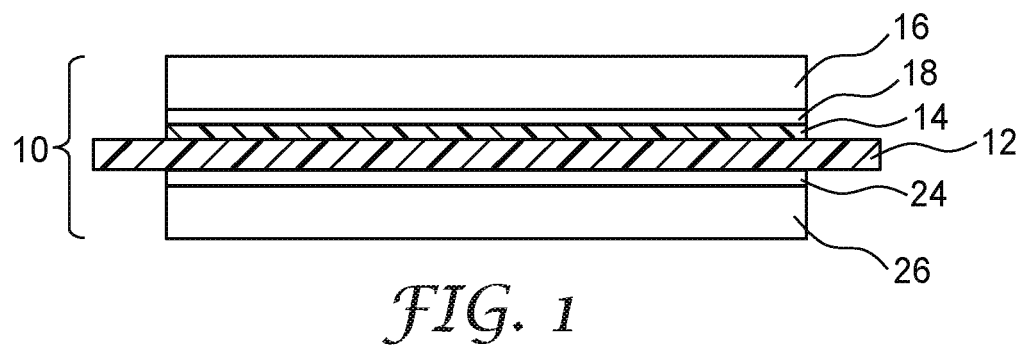
FIG. 1 is a schematic cross-sectional view of a membrane electrode assembly according to an embodiment of the present disclosure.

For the purpose of illustrating typical embodiments of the present disclosure, typical embodiments of the present invention are described in detail below, referring to the drawings, but the present invention is not limited to these embodiments. Regarding the reference numerals in the drawings, constituents labeled with similar numbers across different drawings are similar or corresponding constituents.

In the present disclosure, the term, "membrane electrode assembly" means a structure including a membrane and an electrode and, more specifically, a structure including an electrolyte membrane, typically a polymer electrolyte membrane, and at least one, but more typically at least two electrodes adjacent to the electrolyte membrane.

The term "nanostructured element" means an acicular discrete microscopic structure that includes catalytic material on at least a portion of the surface.

The term "microstructure" means a discrete microscopic structure. The term "microscopic" means a structure that has a dimension in at least one direction 1 micrometer.

The term "discrete" is used with the intent to refer to elements with integrity, but that can be recognized as having a separate identity, but does not preclude elements from being in contact with one another.

The term "nanoscopic catalyst particle" means a particle of catalytic material having a dimension in at least one direction of up to 15 nm or a crystallite size of up to 15 nm, as measured from diffraction peak half widths of standard 2-theta x-ray diffraction scans.

The term "acicular" means having a height not less than three times the average width in cross-section.

A membrane electrode assembly of an embodiment of the present disclosure includes an electrolyte membrane; an anode electrode catalyst layer in contact with the electrolyte membrane; an anode gas diffusion layer; and a fluorinated polymer layer in contact with the anode electrode catalyst layer between the anode electrode catalyst layer and the anode gas diffusion layer.

FIG. 1 is a schematic cross-sectional view illustrating membrane electrode assembly 10 according to an exemplary embodiment of the present disclosure. In membrane electrode assembly 10, anode electrode catalyst layer 14 is disposed on an upper side of electrolyte membrane 12, and electrolyte membrane 12 is in contact with anode electrode catalyst layer 14. Anode gas diffusion layer 16 and fluorinated polymer layer 18 are disposed on anode electrode catalyst layer 14, and fluorinated polymer layer 18 is in contact with anode electrode catalyst layer 14 between anode electrode catalyst layer 14 and anode gas diffusion layer 16. In FIG. 1, cathode electrode catalyst layer 24 and cathode gas diffusion layer 26 are further disposed on a lower side of electrolyte membrane 12.

A polymer electrolyte membrane that includes an ion conductive polymer can be used as the electrolyte membrane. The ion conductive polymer can include an anionic functional group such as a sulfonate group, a carbonate group, or a phosphonate group bonded to a polymer backbone, of which preferably a sulfonate group is used. The ion conductive polymer can include an imide group, an amide group, or another acidic functional group.

An example of a useful ion conductive polymer is a highly-fluorinated, typically fully-fluorinated, fluorocarbon material. Such a fluorocarbon material can be a copolymer of tetrafluoroethylene and one or more types of fluorinated acidic functional co-monomers. Fluorocarbon resin has high chemical stability with respect to halogens, strong acids, and bases. For example, when high oxidation resistance or acid resistance is desirable in the cathode electrode of the fuel cell, a fluorocarbon resin having a sulfonate group, a carbonate group, or a phosphonate group, and in particular a fluorocarbon resin having a sulfonate group can be advantageously used. Examples of fluorocarbon resins having a sulfonate group include those available under the trade designations "DYNEON" from 3M Company, St. Paul, Minn.; "NAFION" from E.I. du Pont de Nemours and Company, Wilmington, Del.; "FLEMION" from Asahi Glass Co., Ltd., Tokyo, Japan; "ACIPLEX" from Asahi Kasei Chemicals, Tokyo, Japan). In some embodiments, the sulfonate group equivalent weight of the ion conductive polymer is present in a range from 500 to 1200 (in some embodiments, 600 to 1150, or even 800 to 1100).

The electrolyte membrane may be a composite membrane including a porous membrane in combination with the ion conductive polymer. The porous membrane preferably has porosity sufficient to allow the injection or absorption of at least one type of solution of the ion conductive polymer, and strength sufficient to withstand the operating conditions of the fuel cell. Examples of such a porous membrane include porous membranes of fluorinated polymers such as polyolefins, polyvinyl chloride, expanded polytetrafluoroethylene. The porous membrane may be a microporous film fabricated by thermally induced phase separation (TIPS) such as that described in, for example, U.S. Pat. No. 4,539,256 (Shipman), U.S. Pat. No. 4,726,989 (Mrozinski), U.S. Pat. No. 4,867,881 (Kinzer), U.S. Pat. No. 5,120,594 (Mrozinski), and U.S. Pat. No. 5,260,360 (Mrozinski). Examples of polymers suited for the fabrication of a microporous film using TIPS include acrylic polymers, for examples, high and low-density polyethylene, polypropylene, polybutadiene, poly(methyl methacrylate) and fluorinated polymers, for example, poly(vinylidene fluoride).

In some embodiments, the thickness of the electrolyte membrane is in a range from 1 micrometer to 50 micrometers (in some embodiments, 5 micrometers to 40 micrometers, or even 10 micrometers to 30 micrometers).

The anode electrode catalyst layer includes a plurality of nanostructured elements that include acicular microstructured support whiskers that support nanoscopic catalyst particles. The structure and method of manufacturing the electrode catalyst layer that includes the nanostructured elements that include acicular microstructured support whiskers that support nanoscopic catalyst particles are described in, for example, U.S. Pat. No. 5,338,430 (Parsonage et al.), U.S. Pat. No. 5,879,827 (Debe et al.), U.S. Pat. No. 6,040,077 (Debe et al.), and U.S. Pat. No. 6,319,293 (Debe et al.); PCT Pub. No. WO/2001/011704 (Spiewak et al.); and U.S. Pat. Appl. Pub. No. 2002/0004453 (Haugen et al.).

For example, the electrode catalyst layer that includes the nanostructured elements that include acicular microstructured support whiskers that support nanoscopic catalyst particles can be manufactured as follows. First, a base member such as a polyimide film (available, for example under the trade designation "KAPTON" from DuPont Electronics, Wilmington, Del.) having, as necessary, a surface texture is prepared. Then, a support material selected from polynuclear aromatic hydrocarbon and heteroaromatic compounds (see, e.g., Morrison and Boyd, Organic Chemistry, Third Edition, Allyn and Bacon, Inc. (Boston: 1974), Chapter 31) is deposited on the base member. For example, naphthalene, phenanthrene, perylene, anthracene, coronene, pyrene, and N,N'-di(3,5-xylyl)perylene-3,4:9,10-bis(dicarboximide) (available, for example, from American Hoechst Corp., Somerset, N.J., under the trade designation "C.I. PIGMENT RED 149," hereafter also referred to as "perylene red") can be used as the support material. Typically, perylene red is used as the support material and it is deposited by vacuum deposition, sputtering, physical vapor deposition, chemical vapor deposition, or thermal sublimation (thermal sublimation is typically used for perylene red). In some embodiments, when forming uniformly oriented acicular microstructured support whiskers containing perylene red, the temperature of the base member is in a range from 0° C. to 30° C. while depositing the perylene red. In some embodiments, the thickness of the support material layer formed in this way is typically in a range from 1 nm to 1 micrometer (in some embodiments, 0.03 micrometer to 0.5 micrometer).

Thereafter, the shape of the support material layer is physically changed by annealing the deposited support material under reduced pressure, and a plurality of acicular microstructured support whiskers is formed arranged in the form of a layer on the base member. The acicular microstructured support whiskers are normally oriented about uniformly in a direction perpendicular to the surface of the base member. The orientation state is determined by the annealing temperature, pressure, and time, the type of support material, or the thickness of the support material layer. In some embodiments, when the support material is perylene red, the annealing temperature is in a range from 160° C. to 270° C., and the time is in a range from 10 minutes to 6 hours, under reduced pressure (less than about $1 \times 10^{-3}$ Torr). When the thickness of the perylene red support material layer is at least 0.05 micrometer, (in some embodiments, at least 0.15 micrometer), in order to transform the deposited perylene red into the acicular microstructured support whiskers without loss due to sublimation, preferably the annealing temperature is in a range from 245° C. to 270° C.

The length and shape of the individual acicular microstructured support whiskers may be substantially the same or they may be different. In some embodiments, the average diameter of the whisker cross-section is substantially uniform, wherein "the average diameter of the whisker cross-section" is the average value of the dimension of the lateral cross-section along the main axis of the whisker. In some embodiments, the average diameter of the whisker cross-section is in a range from 20 nm to 1 micrometer (in some embodiments, in a range from 20 nm to 0.1 micrometer, or even 100 nm to 50 micrometers). In some embodiments, the length of the whisker is in a rage from 0.1 micrometer to 50 micrometers (in some embodiments, in a range from 1 micrometer to 5 micrometers, or even 1 micrometer to 3 micrometers), wherein the whisker length is defined as the length along the whisker main axis.

In some embodiments, an average aspect ratio of the acicular microstructured support whiskers is in a range from 3:1 to 100:1 (in some embodiments, in a range from 4:1 to 50:1, or even 5:1 to 20:1), wherein the "average aspect ratio" is the value of the length of a whisker divided by the average diameter of the whisker cross-section (as described above), averaged over a plurality of microstructured support whiskers. In some embodiments, the areal density of the acicular microstructured support whiskers is in a range from 0.1 whisker/micrometer$^2$ to 1000 whiskers/micrometer$^2$ (in some embodiments, 1 whisker/micrometer$^2$ to 100 whiskers/micrometer$^2$).

Next, electrically conductive catalytic material is deposited on the acicular microstructured support whiskers by vacuum deposition, sputtering, physical vapor deposition, or chemical vapor deposition. Exemplary catalytic materials include transition metals such as Au, Ag, Pt, Os, Ir, Pd, Ru, Rh, Sc, V, Cr, Mn, Co, Ni, Cu, and Zr; low melting point metals such as Bi, Pd, In, Sb, Sn, Zn, and Al; high melting point metals such as W, Re, Ta, and Mo, and alloys or mixtures thereof. In some embodiments, particularly desirable catalytic materials are Pt or a Pt alloy (e.g., an alloy of Pt and at least one type of metals selected from the group consisting of Co, Mn, and Ru). An exemplary method of deposition of the catalyst material is disclosed in, for example, U.S. Pat. No. 5,338,430 (Parsonage et al.), U.S. Pat. No. 5,879,827 (Debe et al.), U.S. Pat. No. 5,879,828 (Debe et al.), U.S. Pat. No. 6,040,077 (Debe et al.), and U.S.

Pat. No. 6,319,293 (Debe et al.), and U.S. Pat. Appl. Pub. No. 2002/0004453 (Haugen et al.). In this method, fine particles of catalyst material with a dimension of several nm, for example, from 2 nm to 10 nm, in a certain direction are formed on the surface of the acicular microstructured support whiskers, and at least a portion of the surface of the acicular microstructured support whiskers is covered with the catalyst material. The thickness of the film of the catalyst material is generally in a range from 0.2 nm to 50 nm (in some embodiments, in a range from 1 nm to 20 nm). The film of the catalyst material may be present in a plurality of disconnected areas on the surface of the same acicular microstructured support whisker. When the catalyst material is deposited so that the catalyst material is incident in the direction substantially perpendicular to the surface of the base member that supports the acicular microstructured support whiskers, smaller discrete nanoscopic catalyst particles may grow on the side surfaces of the acicular microstructured support whiskers. The surface area of these catalyst particles that have a fractal-like structure approaches the theoretical maximum value, so it is possible to achieve high catalytic activity with less catalyst material.

The catalyst particles may include alternating layers of at least two types of catalyst material with different compositions, degrees of alloy and/or degrees of crystallinity. For example, U.S. Pat. No. 5,879,827 (Debe et al.) and U.S. Pat. No. 7,419,741 (Vernstrom et al.) describe a ternary catalyst including a nanostructure formed by alternately depositing Pt and a second material on acicular microstructured support whiskers. Examples of the second material include Ni, Co, Mn, Fe, and alloys thereof. The alternating layers of catalyst material are, for example, formed by sputtering from a plurality of targets (e.g., Ir is sputtered from a first target, Pt is sputtered from a second target, and Ru (when present) is sputtered from a third target), or from a target that includes at least two types of elements.

In some embodiments, the catalyst particles are present in an effective region of the membrane-electrode assembly at an amount in a range from 0.5 microgram/$cm^2$ to 200 micrograms/$cm^2$ (in some embodiments, in a range from 1 microgram/$cm^2$ to 100 micrograms/$cm^2$, or even 5 micrograms/$cm^2$ to 50 micrograms/$cm^2$).

The anode electrode catalyst layer further includes oxygen evolution reaction catalyst particles supported on at least one of the acicular microstructured support whiskers and the nanoscopic catalyst particles. The oxygen evolution reaction catalyst particles predominantly cause the electrolysis of water. As a result, degradation of the anode electrode catalyst layer that occurs when fuel (e.g., hydrogen) is deficient at the anode electrode, or corrosion of the anode gas diffusion layer due to oxidation of the carbon included in the anode gas diffusion layer that is adjacent to the anode electrode catalyst layer can be prevented during the startup/shutdown cycle of the fuel cell, and during irregular operation of the fuel cell.

The oxygen evolution reaction catalyst particles may include Ir, Ru, Pd, and similar metals, oxides thereof, and alloys or composite oxides thereof. In one exemplary embodiment, the oxygen evolution reaction catalyst particles include iridium oxide ($IrO_2$).

The oxygen evolution reaction catalyst particles may be formed by depositing a single metal such as Ir, Ru, Pd, an alloy thereof, a metal oxide of Ir, Ru, Pd, or a metal compound such as a metal hydroxide, or an organic metal complex on the surface of the acicular microstructured support whiskers or on the nanoscopic catalyst particles by vacuum deposition, sputtering, physical vapor deposition, or chemical vapor deposition. As necessary, annealing may be performed after the depositing. The formation of the oxygen evolution reaction catalyst particles may be performed simultaneously with the forming of the catalyst particles, or may be performed after the formation of the catalyst particles.

In some embodiments, the oxygen evolution reaction catalyst particles are present in an effective region of the membrane electrode assembly at an amount in a range from 0.5 microgram/$cm^2$ to 100 micrograms/$cm^2$ (in some embodiments, in a range from 1 microgram/$cm^2$ to 80 micrograms/$cm^2$, or even 5 micrograms/$cm^2$ to 50 micrograms/$cm^2$).

In this way, it is possible to form a catalyst coated membrane (CCM) that includes an electrolyte membrane and an electrode catalyst layer that includes a nanostructured element that includes these whiskers, by applying the acicular microstructured support whiskers that support the nanoscopic catalyst particles obtained in this way to the electrolyte membrane described above. For example, the base member having on the surface thereof the acicular microstructured support whiskers that support the nanoscopic catalyst particles can be disposed on top of the electrolyte membrane so that the whiskers face the surface of the electrolyte membrane. Then, by heating and applying pressure to the resulting stack using a laminator, and then removing the base member, it is possible to transfer the whiskers from the base member to the electrolyte membrane, with the whiskers embedded in the electrolyte membrane.

A base member that has gas permeability and electrical conductivity can be used as the anode gas diffusion layer (GDL). A base member can be used alone as the GDL, or a base member that has been subjected to surface coating can be used. Any material capable of collecting the current from the electrode catalyst layer while allowing the reaction gas to pass can be used as the base member of the GDL. The GDL provides fine holes to bring gaseous reaction substances and water vapor into close contact with the electrode catalyst layer and the electrolyte membrane, and collects the current generated in the electrode catalyst layer and supplies electrical power to an external load. Generally, carbon paper can be used as the GDL. A mesh, porous web or porous fabric, for example, made from an electrically conductive material such as carbon can be used as the GDL. The GDL may be subjected to a water repellency treatment using a conventionally known method. The water repellent material used in the water repellency treatment can be, for example, a fluorinated polymer such as polytetrafluoroethylene (PTFE), polyvinylidene difluoride (PVDF), polyhexafluoropropylene, tetrafluoroethylene-hexafluoropropylene copolymer (FEP), or a polyolefin such as polyethylene or polypropylene. Carbon paper (available, for example, under the trade designation "U105;" thickness: about 240 micrometers) which is available, for example, from Mitsubishi Rayon Co., Ltd., Chiyoda-ku, Tokyo, Japan, can be advantageously used as the GDL.

A carbon layer may be formed on the surface of the GDL. The carbon layer formed on the GDL can be formed using a composition that includes carbon particles and a water repellent agent. When the carbon layer is used, it is possible to discharge water in the electrode catalyst layer that is disposed adjacent to the GDL in the fuel cell outside by using the capillary phenomenon. The carbon layer is preferably formed on the surface of the GDL facing the electrode catalyst layer.

Conventional carbon particles can be used as the carbon particles. Examples thereof include a carbon black, graphite, or expanded graphite. Carbon black such as an oil furnace black, channel black, lamp black, thermal black, and acetylene black have excellent electronic conductivity and large specific surface area, and can be advantageously used. In some embodiments, the particle diameter of the carbon particles is in a range from 10 nm to 100 nm. The same water repellent agent as the water repellent material used in the water repellent treatment of the GDL can be used as the water repellent agent, and preferably a fluorinated polymer is used due to the excellent water repellency and corrosion resistance thereof.

The fluorinated polymer layer includes one of fully-fluorinated or partially-fluorinated polymer particles that have been dispersed in a network form. The phrase "dispersed in a network form" means that, when observing the fluorinated polymer layer using, for example, a SEM or similar electron microscope from a direction orthogonal to the main surface of the layer, there are regions where the fluorinated polymer particles exist densely and regions where the fluorinated polymer particles exist sparsely, and the sparse regions are surrounded by the dense regions. The fluorinated polymer particles may or may not be in contact with each other. Due to the fact that the fully-fluorinated or partially-fluorinated polymer particles are dispersed in a network form, fuel gas such as hydrogen gas and water vapor can pass through the regions where the fluorinated polymer particles are sparse and, additionally, due to the water repellency of the fluorinated polymer particles, formation of a continuous film of liquid water on the surface of the anode electrode catalyst layer is inhibited or prevented.

In some embodiments, the regions where the fluorinated polymer particles exist densely are defined as regions where from 120 to 150 fluorinated polymer particles exist per 1 micrometer$^2$. In some embodiments, the regions where the fluorinated polymer particles exist sparsely are defined as regions where from 0 to 20 fluorinated polymer particles exist per 1 micrometer$^2$. In some embodiments, there are regions where no fluorinated polymer particles exist per 1 micrometer$^2$.

The fully-fluorinated or partially-fluorinated polymer particles may include one or more types of a fluorinated polymer, copolymer, terpolymer, and crosslinked product thereof, which can be obtained by polymerizing a fluorinated monomer such as tetrafluoroethylene (TFE), vinyl fluoride, vinylidene fluoride (VDF), hexafluoropropylene (HFP), pentafluoropropylene, trifluoroethylene, chlorotrifluoroethylene (CTFE), perfluoromethyl vinyl ether (PMVE), perfluoropropylvinyl ether (PPVE), or a mixture thereof. The fully-fluorinated or partially-fluorinated polymer particles may include polymerization units derived from a non-fluorinated monomer such as ethylene, propylene, or butylene, in addition to the fluorinated polymer, copolymer, terpolymer, and crosslinked product thereof.

In some embodiments, the fully-fluorinated or partially-fluorinated polymer particles include at least one of polytetrafluoroethylene and tetrafluoroethylene-hexafluoropropylene copolymer. These polymers have high water repellency and, thus, are particularly useful.

In some embodiments, the average particle size of the fully-fluorinated or partially-fluorinated polymer particles is in a range from 30 nm to 200 nm (in some embodiments, in a range from 40 to 150, or even 50 to 100). Due to the fact that the average particle size of the fully-fluorinated or partially-fluorinated polymer particles is in the range described above, the network formation of the fluorinated polymer particles can be promoted when forming the fluorinated polymer layer; and the fluorinated polymer particles can be suppressed or prevented from filling the fine gaps between the nanostructure elements of the anode electrode catalyst layer though which the fuel gas passes and blocking these gaps.

In some embodiments, the areal density of the fluorinated polymer layer in an effective region of the membrane electrode assembly is in a range from 10 micrograms/cm$^2$ to 50 micrograms/cm$^2$ (in some embodiments, in a range from 12 micrograms/cm$^2$ to 40 micrograms/cm$^2$, or even 15 micrograms/cm$^2$ to 30 micrograms/cm$^2$). Areal densities of the fluorinated polymer layer in the amounts described above tend to form continuous films of liquid water that can more effective in inhibiting or preventing suppressing excessive increases in the internal resistance of the membrane electrode assembly.

The fluorinated polymer layer can be formed by, prior to assembling the membrane electrode assembly, applying a dispersion liquid obtained by dispersing the fully-fluorinated or partially-fluorinated polymer particles in a solvent to the surface of the anode electrode catalyst layer facing the anode gas diffusion layer or the surface of the carbon layer formed thereon that faces the anode electrode catalyst layer, and drying. The dispersion liquid is preferably applied to the surface of the anode electrode catalyst layer facing the anode gas diffusion layer. As a result, adhesion between the anode electrode catalyst layer and the fluorinated polymer layer can be improved, and the formation of a continuous film of liquid water can be more effectively inhibited or prevented.

The dispersion liquid of the fully-fluorinated or partially-fluorinated polymer particles can be prepared by mixing the fluorinated polymer particles with a solvent such as water; an alcohol such as methanol, ethanol, n-propanol, or 2-propanol; an ether such as 1,4-dioxane, n-propyl ether, or the like; a ketone such as acetone or methyl ethyl ketone; an ester such as ethyl acetate or butyl acetate; dimethyl sulfoxide; dimethyl formamide; a fluorine-containing compound such as a fluorine-containing alcohol having 1 to 6 carbons, a fluorine-containing ether having 1 to 6 carbons, or a fluorine-containing alkane having 1 to 6 carbons; using a homogenizer, a ball mill, a bead mill, a jet mill, or an ultrasonic device. In some embodiments, particularly desirable solvents include water or an alcohol. In these embodiments, the use of water or an alcohol may increase the polarity of the solvent and promote the formation of the network of fluorinated polymer particles when forming the fluorinated polymer layer.

In some embodiments, the solid content of the dispersion liquid is in a range from 0.1 mass % to 10 mass % (in some embodiments, 0.2 mass % to 5 mass %). The dispersion liquid may be prepared by diluting a precursor dispersion liquid with high solid content in the solvent described in the previous paragraph.

The dispersion liquid can be applied to the anode electrode catalyst layer or the gas diffusion layer by spraying, die coating, a doctor blade, a bar coater, or dipping. An advantage of spraying a dispersion liquid is application of the dispersion liquid can be restricted to only the vicinity of the layer surfaces. As a result, the formation of a continuous film of liquid water can more effectively be inhibited or prevented with a smaller amount of the fluorinated polymer particles while suppressing excessive increases in the internal resistance of the membrane electrode assembly.

After applying the dispersion liquid, the solvent is volatilized by heating or drying at room temperature. Thus, the fluorinated polymer layer can be formed. The heating can be performed using a conventionally known appropriate method. In some embodiments, heating is conducted at a temperature at which the fluorinated polymer particles do not dissolve (e.g., up to about 200° C. (in some embodiments, up to about 150° C.)).

The membrane electrode assembly generally includes a cathode electrode catalyst layer. The cathode electrode catalyst layer can include known carbon supporting catalyst particles in which catalyst material is supported on carbon particles. The same materials described above for the catalyst material of the nanoscopic catalyst particles can be used for catalyst material on the carbon supporting particles, of which Pt or an alloy thereof is preferable. The content of the carbon supporting catalyst particles in the cathode electrode catalyst layer may be appropriately determined within a range where the corrosion/loss of the carbon support is not a problem in terms of practical use. An electrode catalyst layer that includes a plurality of nanostructure elements including acicular microstructured support whiskers that support nanoscopic catalyst particles, similarly to the anode electrode catalyst layer can be used as the cathode electrode catalyst layer.

The membrane electrode assembly generally includes a cathode gas diffusion layer. The same materials as described above for the anode gas diffusion layer can be used for the cathode gas diffusion layer.

The membrane electrode assembly can be manufactured using methods that are known in this technical field. For example, as described above, the membrane electrode assembly can be manufactured by forming a catalyst coated membrane (CCM) by applying the acicular microstructured support whiskers that support the nanoscopic catalyst particles to the electrolyte membrane and, thereafter, sandwiching the catalyst coated membrane by the gas diffusion layer and, then, pressure bonding these constituents using a hot press, a roll press, or an adhesive, if necessary.

The membrane electrode assembly manufactured in this way can be incorporated into a solid polymer fuel cell that can be used as the power source for a movable body such as a vehicle, or as a fixed power source. The fuel cell may have any conventionally known configuration, and, generally, has a structure in which the membrane electrode assembly is sandwiched between separators and, as necessary, sealing materials such as gaskets. Any conventionally known material such as carbon-containing materials such as precision carbon graphite, carbon plates; metal materials such as stainless steel can be used as the separators sandwiching the membrane electrode assembly. In some embodiments, the separators are electrically conductive. The separators may have a function of separating the fuel gas from the oxidant gas. Flow channels may be formed in the separators to distribute oxidant gases such as air, fuel gases such as hydrogen, or generated products. The thickness and size of the separators, and the shape of the gas flow channels can be determined appropriately by a person skilled in the art by considering the necessary output characteristics of the fuel cell. Any of a variety of materials having the function of sealing so that gas in the interior of the membrane electrode assembly does not leak may be used as the sealing material. Examples thereof include a compressible material such as a silicone or a fluorinated polymer. A high strength composite sealing material in which a reinforcing material such as glass fiber is covered with these materials can be used.

According to an embodiment, a solid polymer fuel cell includes the membrane electrode assembly described above, and an anode separator including at least one of parallel flow channels and opposing comb-shaped flow channels. The anode separator may include a combination of parallel flow channels and opposing comb-shaped flow channels, or may include a combination with other types of flow channels.

The term "parallel flow channels" refers to a configuration that includes first and second busbar flow channels arranged substantially in parallel, and a plurality of flow channels arranged between these busbar flow channels. A first end portion of the plurality of flow channels is connected to the first busbar flow channel and a second end portion is connected to the second busbar flow channel Thus, the busbar flow channels are in communication with each other. The plurality of flow channels may be arranged substantially in parallel. A portion or all of the plurality of flow channels may be serpentine flow channels that include a bent portion. The plurality of flow channels may have a shape and arrangement in which the fuel gas or the oxidant gas flows through the interior of the plurality of flow channels from the end portion connected to one of the busbar flow channels toward the end portion connected to the other of the busbar flow channels. In an exemplary embodiment, an introduction port for the fuel gas or the oxidant gas is provided on one of the busbar flow channels, and the fuel gas or the oxidant gas flows from that busbar flow channel, through the plurality of flow channels, toward the other of the busbar flow channels.

The term "opposing comb-shaped flow channels" refers to a configuration that includes two comb-shaped flow channels. In each of the comb-shaped flow channels, a first end portion of a plurality of flow channels is connected so as to be in communication with one busbar flow channel. The plurality of flow channels of one of the comb-shaped flow channels and the plurality of flow channels of the other of the comb-shaped flow channels are arranged so as to be alternately adjacent to each other. Generally, in opposing comb-shaped flow channels, a direction in which the fuel gas or the oxidant gas flows in the interior of the flow channels connected to one busbar flow channel is opposite to a direction in which the fuel gas or the oxidant gas flows in the interior of the flow channels connected to the other busbar flow channel, which is adjacent to the one busbar flow channel. The plurality of flow channels may be arranged substantially in parallel. A portion or all of the plurality of flow channels may be serpentine flow channels that include a bent portion. In an embodiment, an introduction port for the fuel gas or the oxidant gas is provided on each of the two busbar flow channels, and the fuel gas or the oxidant gas flows from these busbar flow channels toward the plurality of flow channels.

For example, compared to a serpentine flow channel where a single-long flow channel winds from one corner of a separator to another corner located at a corner diagonally opposite thereto, with the parallel flow channels and the opposing comb-shaped flow channels, the gas flow rate is generally lower and is disadvantageous with regards to the discharging of liquid water. By using the membrane-electrode assembly of the present disclosure, the output performance of the fuel cell can be improved, even when combined with a separator that has a flow field design resulting in low gas flow rates.

In some embodiments, the width of the plurality of flow channels of the parallel flow channels and the opposing comb-shaped flow channels is in a range from 0.1 mm to 3 mm (in some embodiments, 0.2 mm to 2 mm, or even 0.3 mm to 1 mm); a depth in a range from 0.1 mm to 2 mm (in some embodiments, 0.3 mm to 1 mm, or even 0.5 mm to 0.8 mm); and a cross-sectional area in a range from 0.05 mm$^2$, to 1.5 mm$^2$ (in some embodiments, 0.08 mm$^2$ to 1 mm$^2$, or even 0.1 mm$^2$ to 0.8 mm$^2$). The cross-section of these flow channels may be a variety of shapes such as rectangular, square, inverted trapezoidal, wedge-shaped, semi-circular, or semi-oval. The length of these flow channels is determined depending on the size of the membrane electrode assembly. In some embodiments, where this size is 50 cm², the length in a range from 6 cm to 400 cm (in some embodiments, 15 cm to 80 cm, or even 30 cm to 50 cm).

In some embodiments, the width of the busbar flow channels of the parallel flow channels and the opposing comb-shaped flow channels is in a range from 0.2 mm to 5 mm (in some embodiments, 0.5 mm to 3 mm, or even 1 mm to 2 mm), the depth thereof is in a range from 0.3 mm to 5 mm (in some embodiments, 0.5 mm to 3 mm, or even 0.8 mm to 1 mm); and a cross-sectional area is in a range from 0.2 mm² to 5 mm² (in some embodiments, 0.5 mm² to 3 mm², or even 0.8 mm² to 1 mm²). The cross-section of the busbar flow channels may be a variety of shapes such as rectangular, square, inverted trapezoidal, wedge-shaped, semi-circular, or semi-oval. The length of the busbar flow channels is determined depending on the size of the membrane electrode assembly, but in an embodiment where this size is 1 cm², the length is, for example, in a range from 5 mm to 20 mm (in some embodiments, 8 mm to 18 mm, or even 10 mm to 15 mm).

The fuel cell may be used as a single cell that includes a single membrane electrode assembly or, in order to obtain a higher voltage or output, a fuel cell stack may be formed in which a plurality of membrane electrode assemblies is connected in series and stacked with separators disposed therebetween. The shape, arrangement, electrical connections, and the like can be determined as appropriate by a person skilled in the art in order to obtain the desired cell characteristics such as voltage or output.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

In the following examples, specific embodiments of the present disclosure are given by way of example, but the present invention should not be construed as being restricted thereto. All parts and percentages are by mass unless otherwise indicated.

Manufacture of Acicular Microstructured Support Whiskers That Support Nanoscopic Catalyst Particles A prismatic surface structure with a distance between peaks of about 10 micrometers and a depth of about 6 to 7 micrometers was formed on a polyimide base member, in accordance with the method described in PCT Pub. No. WO2001/011704, published Feb. 15, 2001, the disclosure of which is incorporated herein by reference. The microstructured support was formed on the polyimide base member by thermal sublimation and vacuum annealing of an organic pigment ((N,N'-di(3,5-xylyl)perylene-3,4:9,10-bis(dicarboximide)) obtained under the trade designation "C.I. PIGMENT RED 149" from Clariant, Charlotte, N.C.). Details of a method for manufacturing such an organic microstructured layer are described in Materials Science and Engineering, A158 (1992), pp. 1-6; and J. Vac. Sci. Technol. A, 5(4), July/August 1987, pp. 1924-16. The resulting microstructured support was oriented in a direction perpendicular to the surface of the polyimide base member, and was constituted from several whiskers having a whisker cross-sectional diameter from 30 to 50 nm and a length from 1 to 2 micrometers. An area number density of the whiskers per unit area of the base member surface was about 30 whiskers/micrometers². Next, vacuum deposition was performed to cover the surface of the microstructured support whiskers with Pt alloy. As described in U.S. Pat. No. 5,338,430 (Parsonage et al.), U.S. Pat. No. 5,879,827 (Debe et al.), U.S. Pat. No. 5,879,828 (Debe et al.), U.S. Pat. No. 6,040,077 (Debe et al.), and U.S. Pat. No. 6,319,293 (Debe et al.) and U.S. Pat. Appl. Pub. No. 2002/0004453 (Haugen et al.), the disclosures of which are incorporated herein by reference, the base member was mounted on a drum and, then, vacuum deposition was performed by rotating the drum under a DC magnetron sputtering source. The manufactured catalyst sheet included Pt as an oxygen reduction reaction catalyst at 10 micrograms/cm², and $IrO_2$ as an oxygen evolution reaction catalyst at 8 micrograms/cm².

In another embodiment, the acicular microstructured support whiskers is manufactured by the following way.

Nanostructured whiskers were prepared by thermal annealing a layer of perylene red pigment (C.I. Pigment Red 149, also known as "PR149", obtained from Clariant, Charlotte, N.C.), which was sublimation vacuum coated onto microstructured catalyst transfer polymer substrates (MCTS) with a nominal thickness of 200 nm, as described in detail in U.S. Pat. No. 4,812,352 (Debe), the disclosure of which is incorporated herein by reference.

A roll-good web of the MCTS (made on a polyimide film obtained from E.I. du Pont de Nemours, Wilmington, Del., under trade designation "KAPTON") was used as the substrate on which the PR149 was deposited. The MCTS substrate surface had V-shaped features with about 3 micrometer tall peaks, spaced 6 micrometers apart. A nominally 100 nm thick layer of Cr was then sputter deposited onto the MCTS surface using a DC magnetron planar sputtering target and typical background pressures of Ar and target powers known to those skilled in the art sufficient to deposit the Cr in a single pass of the MCTS web under the target at the desired web speed. The Cr coated MCTS web then continued over a sublimation source containing the PR149 pigment material. The PR149 was heated to a controlled temperature near 500° C. so as to generate sufficient vapor pressure flux to deposit 0.022 mg/cm², or approximately 220 nm thick layer of the PR149 in a single pass of the web over the sublimation source. The mass or thickness deposition rate of the sublimation can be measured in any suitable fashion known to those skilled in the art, including optical methods sensitive to film thickness, or quartz crystal oscillator devices sensitive to mass. The PR149 coating was then converted to the whisker phase by thermal annealing, as described in detail in U.S. Pat. No. 5,039,561 (Debe), the disclosure of which is incorporated herein by reference, by passing the PR149 coated web through a vacuum having a temperature distribution sufficient to convert the PR149 as-deposited layer into a layer of oriented crystalline whiskers at the desired web speed such that the whisker layer has an average whisker areal number density of 68 whiskers per square micrometer, determined from SEM images, with an average length of 0.6 micrometer.

Manufacture of Polymer Electrolyte Membrane (PEM)

A dispersion liquid having an ion conductive polymer (sulfonate equivalent weight: 825) solid content of 40% (obtained from 3M Company, St. Paul, Minn.) was applied to the polyimide base member (thickness: 50 micrometer) using a die coater, and then annealed at 200° C. for 3 minutes. Thus, a PEM with a thickness of 20 micrometers was manufactured.

Manufacture of Catalyst Coated Membrane (CCM)

A small, 5 cm square sample (area: 25 cm$^2$) was cut from the catalyst sheet. The catalyst sheet and the PEM were stacked so that the microstructured support whiskers that support the catalyst on the catalyst sheet were in contact with the PEM. The resulting stack was heated and passed through a pressure laminator and, thereafter the polyimide base member was removed. As a result, a CCM sheet, in which one side of the PEM was covered by an anode electrode catalyst layer was manufactured.

Formation of Fluorinated Polymer Layer

Figure 2:
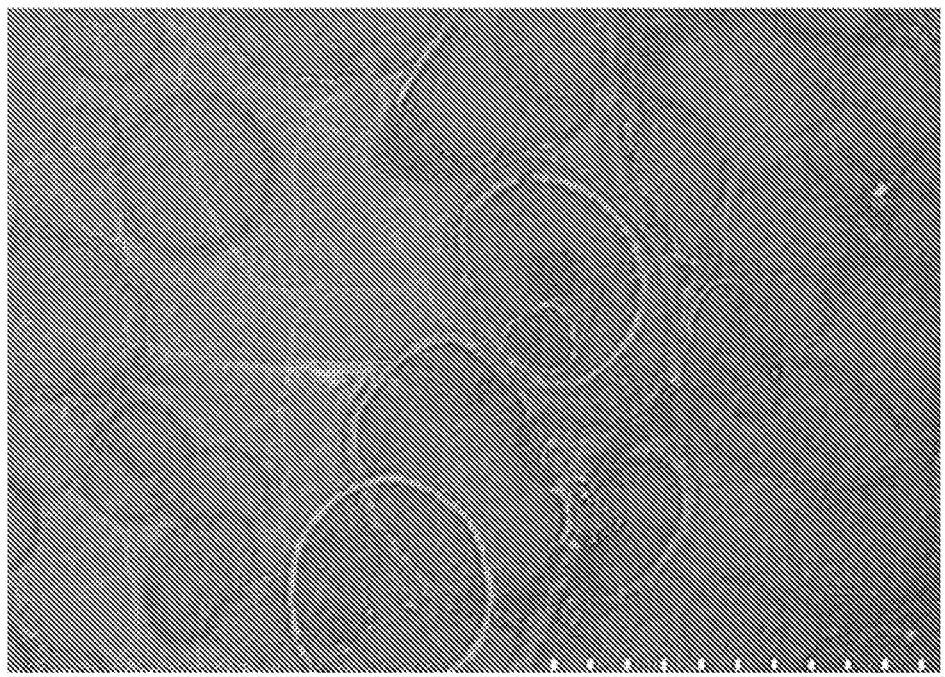
FIG. 2 is a SEM photograph (at 1000-times magnification) of tetrafluoroethylene-hexafluoropropylene copolymer (FEP) particles, dispersed in a network-form, of the fluorinated polymer layer.
Figure 3:
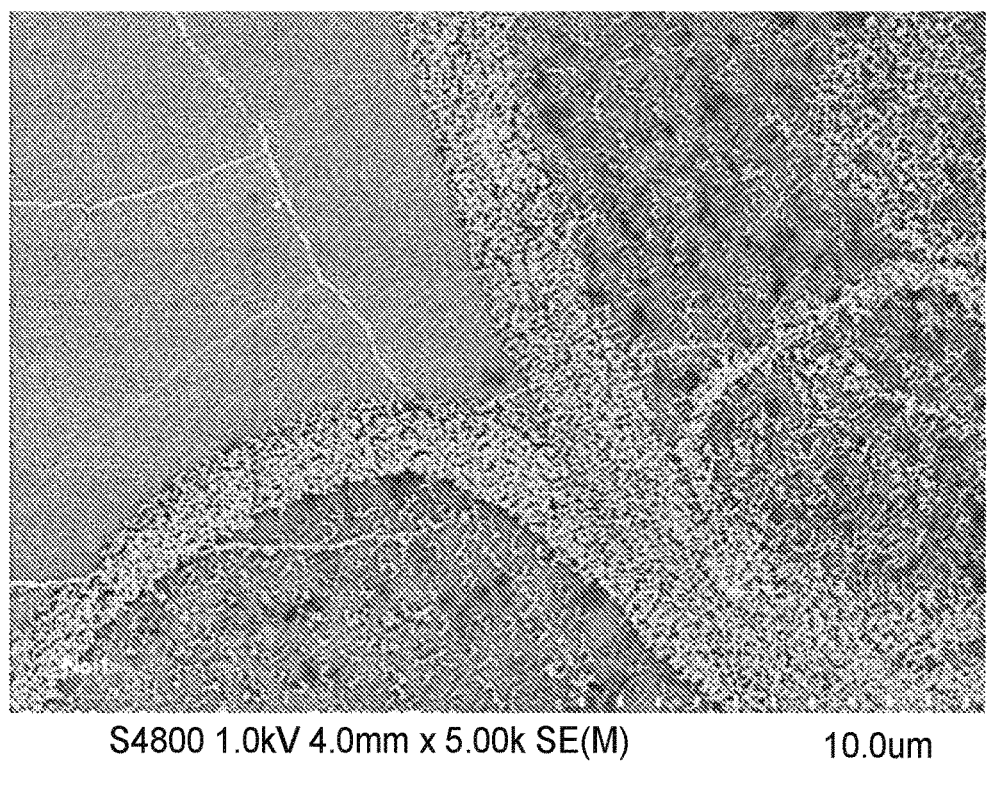
FIG. 3 is a SEM photograph (at 5000-times magnification) of FEP particles, dispersed in a network-form, of the fluorinated polymer layer.

A tetrafluoroethylene-hexafluoropropylene copolymer (FEP) dispersion liquid, obtained by dispersing FEP particles (average particle size: 100 nm; obtained under the trade designation "3M FEP dispersion 6300GM" from 3M St. Paul, Minn.) in distilled water at a solid content of 55%, was diluted with distilled water to prepare a FEP dispersion liquid with 0.5% solid content. Before spray applying the FEP to the CCM, the mass of the CCM sheet, cut to 86 mm square, was measured. Then, the FEP dispersion liquid was sprayed on the anode electrode catalyst layer of the CCM. Thus, a fluorinated polymer layer was formed. The CCM was dried for 10 minutes at 80° C. and, thereafter, the mass of the fluorinated polymer layer-covered CCM sheet was measured again. The mass of the CCM sheet was measured after the CCM sheet had been left at rest in a constant temperature and humidity room for 30 minutes in order to increase the accuracy of the measurement. A mass difference between the CCM sheet before and after the fluorinated polymer layer forming was defined as the mass of the fluorinated polymer layer. FIGS. 2 and 3 are SEM photographs (at 1000-times and 5000-times magnification) of the FEP particles, dispersed in a network form, included in the fluorinated polymer layer.

Manufacture of Gas Diffusion Layer (GDL)

Carbon paper (obtained under the trade designation "U105" Mitsubishi Rayon Co., Ltd., Chiyoda-ku, Tokyo, Japan) was subjected to waterproofing by being immersed in an aqueous dispersion liquid of 5% polytetrafluoroethylene (PTFE), and then dried for 20 minutes at 100° C. Then, acetylene black (obtained under the trade designation "DENKA BLACK 50% PRESS" from Denki Kagaku Kogyo K.K., Chuo-ku, Tokyo, Japan) was mixed into the aqueous dispersion liquid of PTFE and acetylene black was dispersed therein, resulting in a water-repellent layer ink. The water-repellent layer ink was applied to the water-proofed carbon paper using a doctor blade, dried for 20 minutes at 100° C., and finally baked for 3 minutes at 320° C. to provide a GDL.

Manufacture of Pt/Carbon Cathode Electrode Catalyst Layer 9.9 grams of a carbon-supported Pt catalyst (obtained under the trade designation "CAQ062705AB" Pt 0.3 mg/cm$^2$, from N.E. Chemcat Corporation, Minato-ku, Tokyo, Japan), 44.4 grams of an ion conductive polymer (obtained under the trade designation "NAFION DE1021" from E.I. du Pont de Nemours and Company, Wilmington, Del.), and 40 grams of distilled water were placed in a glass vial and homogenized for 30 minutes at 15,000 rpm, resulting in a cathode electrode catalyst layer ink.

The resulting cathode electrode catalyst layer ink was applied to the GDL and dried, providing a sheet of a backing (CCB) covered with the cathode electrode catalyst layer.

Manufacture of Membrane Electrode Assembly (MEA)

Square pieces of the CCB having an area of 50 cm$^2$ or 1 cm$^2$ were cut from the CCB sheet and disposed on the PEM side of the CCM. Next, the GDL was placed on the anode electrode catalyst layer. A gasket was disposed on a heat press around the anode electrode catalyst layer, the PEM, and the cathode electrode catalyst layer, so as to be sandwiched by two layers of the GDL. Then, the resulting stack was heat-pressed for 10 minutes at 145° C., resulting in an MEA.

Manufacture of Single Cells of Solid Polymer Fuel Cell (PEFC)

Single cells (cell A and cell B) of solid polymer fuel cells (PEFC) were made by sandwiching the MEA with two rigid separators. The separators were electrically conductive, and were provided with flow channels for distributing oxidant gas, fuel gas, or generated products.

The area of the effective region of the cell A was 1 cm$^2$, and the separators of the cell A had parallel flow channels. Specifically, the separators of the cell A were provided with three serpentine flow channels disposed substantially in parallel that had a length of 28 mm, a width of 0.52 mm, a depth of 0.27 mm, a cross-sectional area of 0.14 mm$^2$, and a rectangular cross-sectional shape; and two busbar flow channels disposed substantially in parallel so as to sandwich the serpentine flow channels, that had a length of 10 mm, a width of 1.02 mm, a depth of 3 mm, a cross-sectional area of 3.06 mm$^2$, and a rectangular cross-sectional shape. The end portions of the three serpentine flow channels were connected so as to be in communication with either of the busbar flow channels. Each of the serpentine flow channels had two bent portions.

The area of the effective region of the cell B was 50 cm$^2$ and the separators of the cell B had what were referred to as serpentine flow channels. Specifically, four parallel flow channels that had a length of about 78 cm, a width of 0.75 mm, a depth of 1 mm, a cross-sectional area of 0.75 mm$^2$, and a rectangular cross-sectional shape meandered in a rectangular manner, with the long side being from 6.3 to 6.7 mm and the short side being from 2 to 12 mm, from a first corner of the separator to a second corner located diagonally opposite the first corner.

Conditioning (Activation Method) of the Fuel Fell

The cells were operated under the following conditions.

(a) The cells were heated to 73° C. Then, 800 (sccm) of hydrogen (dew point: 70° C.) and 1200 sccm of air (dew point: 70° C.) were introduced into the anode and the cathode, respectively. Next, a set of five minutes of voltage scanning operation (PDS; 0.85 V→0.25 V→0.85 V) and five minutes of voltage holding operation (PSS; 0.4 V) were repeated 12 times.

(b) Operation of the fuel cell was stopped while supplying gas to both of the electrodes, and this state was maintained for not less than 6 hours.

(c) The series of operations of (a) was repeated.

Water Discharge Testing

The cell B was held at 40° C. for 10 minutes in a state where the hydrogen gas flow rate on the anode side was 800 sccm (equivalent ratio at 1 A/cm$^2$ of 2.3-times) and the air flow rate on the cathode side was 1800 sccm (equivalent ratio at 1 A/cm$^2$ of 2.18-times). The dew points of the anode gas flow and the cathode gas flow were maintained at 40° C. throughout the entire test. An average value of the AC impedance for the last 2 minutes at 10 kHz was recorded. Next, the temperature of the cell was sequentially raised to 50° C., 60° C., and 70° C. and the average values of the AC impedance at each temperature were likewise recorded.

Testing was carried out using cell A in the same manner as for cell B, except that the hydrogen gas flow rate for the anode and the air flow rate for the cathode were changed to 400 sccm (equivalent ratio at 1 A/cm² of 57.4 times) and 1800 sccm (equivalent ratio at 1 A/cm² of 48.2-times), respectively.

Humidity Sensitivity Testing Using Cell A

The cells were operated under the following conditions.

(a) The cells were heated to 70° C. Then, 800 sccm of hydrogen (dew point: 60° C.) and 1200 sccm of air (dew point: 60° C.) were introduced into the anode and the cathode, respectively. Next, a set of five minutes of PDS (0.85 V→0.25 V→0.85 V) and five minutes of PSS (0.4 V) was repeated 4 times.

(b) Five minutes of PDS (0.85 V→0.25 V→0.85 V) was performed and, in the meantime, the cell was heated to 80° C. Next, five minutes of PSS (0.4 V) was performed and, thereafter, the relay of the circuit was opened for two seconds and then closed. Then, five=minutes of PSS (0.4 V) was performed.

(c) 10-seconds of current holding operation (GSS; 0.5 A/cm²) and 10 seconds of GSS (1.0 A/cm²) were performed in this order. Then, the current density was increased to 1.5 A/cm² and held for 10 minutes.

(d) The series of operations from (b) to (c) was performed at 75° C.

(e) The series of operations from (b) to (c) was performed at 70° C.

(f) The series of operations from (b) to (c) was performed at 65° C.

(g) The series of operations from (b) to (c) was performed at 60° C.

(h) The series of operations from (b) to (c) was performed at 55° C.

(i) The series of operations from (b) to (c) was performed at 50° C.

(j) The series of operations from (b) to (c) was performed at 48° C.

MEA Structure

Compositions of the anode catalyst layers, and the positions in the MEA and the areal density of the fluorinated polymer layer of Working Examples 1 to 4 and Comparative Examples 1 to 3 are shown in Table 1, below. The same cathode electrode catalyst layer and GDL were used in all of the Working Examples and Comparative Examples.

TABLE 1

| | Anode electrode catalyst layer (micrograms/cm²) | Fluorinated polymer layer | |
|---|---|---|---|
| | | Areal density (micrograms/cm²) | Position |
| Example 1 | Pt 10/IrO₂ 7 | 20 | Between anode electrode catalyst layer and GDL |
| Example 2 | Pt 10/IrO₂ 7 | 24 | Between anode electrode catalyst layer and GDL |
| Example 3 | Pt 10/IrO₂ 7 | 14 | Between anode electrode catalyst layer and GDL |
| Example 4 | Pt 10/IrO₂ 7 | 40 | Between anode electrode catalyst layer and GDL |
| Comparative Example A | Pt 10/IrO₂ 7 | 24 | Between PEM and anode electrode catalyst layer |
| Comparative Example B | Pt 10/IrO₂ 7 | — | — |
| Comparative Example C | Pt 20/IrO₂ 15 | — | — |

Figure 4:
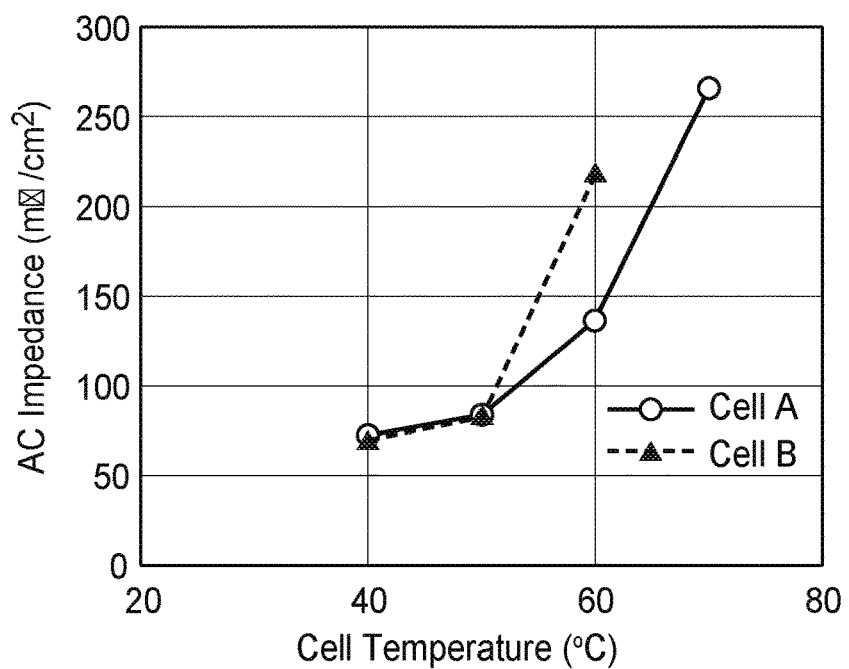
FIG. 4 is a graph showing the results of water discharge testing.

Results of the water discharge testing using the MEA of Comparative Example 3 are shown in FIG. 4. The cell A, which had the parallel flow channels, operated at a higher equivalent ratio than the cell B, which had the serpentine flow channels. In other words, the AC impedance of the cell A was lower, regardless of the gas flow rate being excessively large. This suggests that the cell A is wetter than the cell B during operation and that, compared to the cell B, water is not easily discharged by the gas flow.

Figure 5:
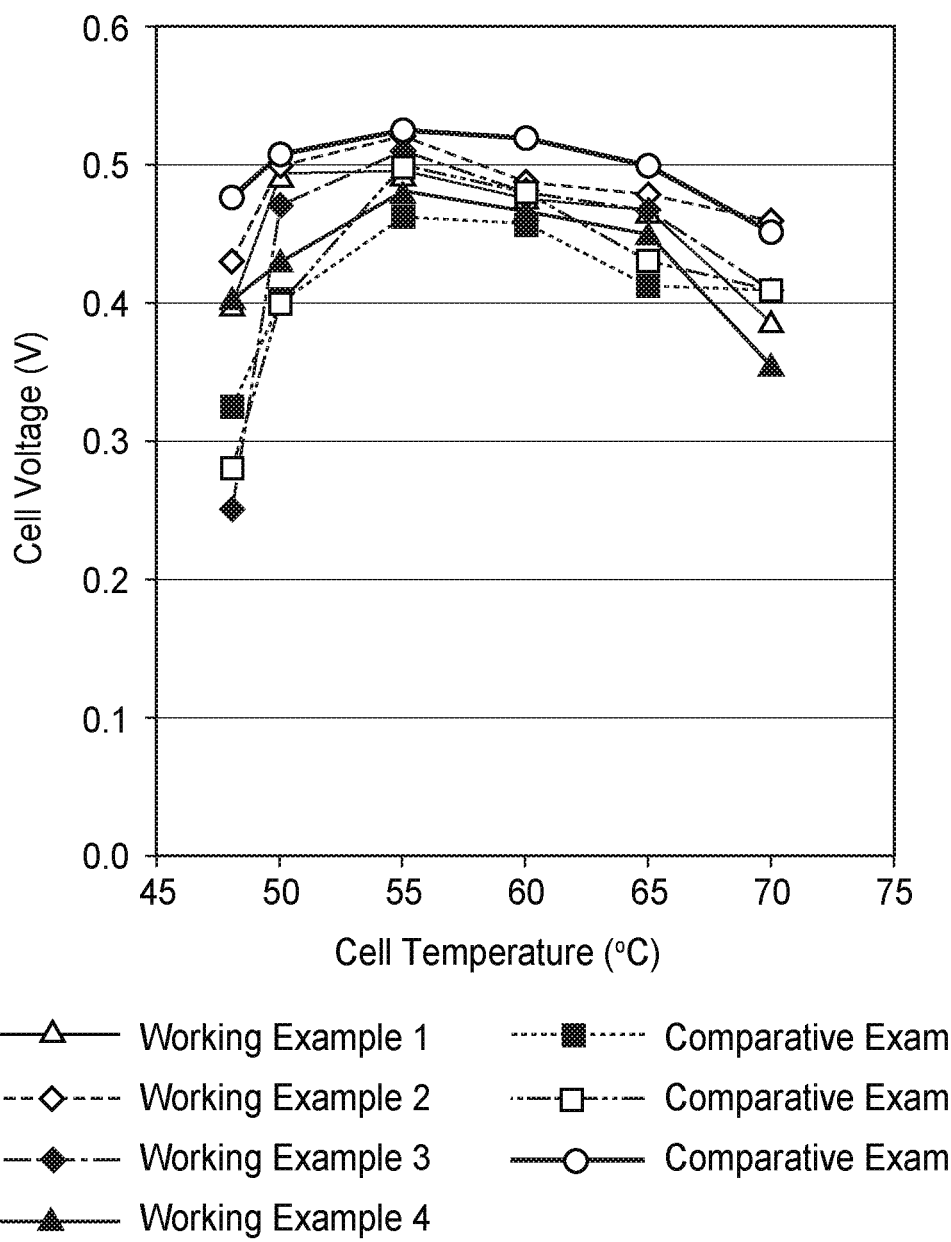
FIG. 5 is a graph showing the results of humidity sensitivity testing.

Results of the humidity sensitivity testing using the MEA of Examples 1 to 4 and Comparative Examples A to C are shown in FIG. 5. In a comparison of Examples 1 to 4, in which the same anode electrode catalyst layer was used, and Comparative Examples A and B, in Examples 1 to 4, cell voltage increased under conditions of a low temperature of around 50° C. and over-humidification.

Foreseeable modifications and alterations of this disclosure will be apparent to those skilled in the art without departing from the scope and spirit of this invention. This invention should not be restricted to the embodiments that are set forth in this application for illustrative purposes.

REFERENCE SIGNS LIST

10 Membrane electrode assembly
12 Electrolyte membrane
14 Anode electrode catalyst layer
16 Anode gas diffusion layer
18 Fluorinated polymer layer
24 Cathode electrode catalyst layer
26 Cathode gas diffusion layer

I claim:

1. A membrane electrode assembly comprising:
an electrolyte membrane;
an anode electrode catalyst layer in contact with the electrolyte membrane;
an anode gas diffusion layer; and
a fluorinated polymer layer in contact with the anode electrode catalyst layer between the anode electrode catalyst layer and the anode gas diffusion layer;
wherein the anode electrode catalyst layer includes a plurality of nanostructure elements including acicular microstructured support whiskers supporting nanoscopic catalyst particles; and
wherein the fluorinated polymer layer includes one of fully-fluorinated or partially-fluorinated polymer particles that have been dispersed in a network form, and
wherein an areal density of the fluorinated polymer layer is in a range from 15 micrograms/cm² to 30 micrograms/cm².

2. The membrane electrode assembly according to claim 1, wherein the fully-fluorinated or partially-fluorinated polymer particles include at least one of polytetrafluoroethylene or tetrafluoroethylene-hexafluoropropylene copolymer.

3. The membrane electrode assembly according to claim 1, wherein an average particle size of the fully-fluorinated and partially-fluorinated polymer particles is from 50 nm to 100 nm.

4. The membrane electrode assembly according to claim 1, wherein the acicular microstructured support whiskers have an average diameter of a whisker cross-section of up to 100 nm, and an average aspect ratio of at least 3:1.

5. The membrane electrode assembly according to claim 1, wherein the anode electrode catalyst layer further includes oxygen evolution reaction catalyst particles supported on at least one of the acicular microstructured support whiskers or the nanoscopic catalyst particles.

6. A solid polymer fuel cell comprising:
the membrane electrode assembly described in claim 1; and an anode separator including at least one of parallel flow channels or opposing comb-shaped flow channels.

7. A membrane electrode assembly comprising:
an electrolyte membrane;
an anode electrode catalyst layer in contact with the electrolyte membrane; and
a fluorinated polymer layer in contact with the anode electrode catalyst layer, the anode electrode catalyst layer between the electrolyte membrane and fluorinated polymer layer,
wherein the anode electrode catalyst layer includes a plurality of nanostructure elements including acicular microstructured support whiskers supporting nanoscopic catalyst particles, and
wherein the fluorinated polymer layer includes one of fully-fluorinated or partially-fluorinated polymer particles that have been dispersed in a network form, and
wherein an areal density of the fluorinated polymer layer is in a range from 15 micrograms/cm$^2$ to 30 micrograms/cm$^2$.

8. The membrane of claim 7, further comprising an anode gas diffusion layer, where the fluorinated polymer layer is between the anode electrode catalyst layer and the anode gas diffusion layer.

9. The membrane electrode assembly according to claim 7, wherein the fully-fluorinated or partially-fluorinated polymer particles include at least one of polytetrafluoroethylene or tetrafluoroethylene-hexafluoropropylene copolymer.

10. The membrane electrode assembly according to claim 7, wherein an average particle size of the fully-fluorinated and partially-fluorinated polymer particles is from 50 nm to 100 nm.

11. The membrane electrode assembly according to claim 7, wherein the acicular microstructured support whiskers have an average diameter of a whisker cross-section of up to 100 nm, and an average aspect ratio of at least 3:1.

12. The membrane electrode assembly according to claim 7, wherein the anode electrode catalyst layer further includes oxygen evolution reaction catalyst particles supported on at least one of the acicular microstructured support whiskers or the nanoscopic catalyst particles.

13. A solid polymer fuel cell comprising:
the membrane electrode assembly described in claim 7; and
an anode separator including at least one of parallel flow channels or opposing comb-shaped flow channels.

* * * * *